United States Patent
Zanoni et al.

(10) Patent No.: US 8,779,955 B1
(45) Date of Patent: Jul. 15, 2014

(54) OPTICAL ANALOG-TO-DIGITAL CONVERSION SYSTEM AND METHOD WITH ENHANCED QUANTIZATION

(71) Applicants: Raymond Zanoni, Columbia, MD (US); Kim S. Jepsen, Elliott City, MD (US); Oliver S. King, Frederick, MD (US)

(72) Inventors: Raymond Zanoni, Columbia, MD (US); Kim S. Jepsen, Elliott City, MD (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/626,642

(22) Filed: Sep. 25, 2012

(51) Int. Cl.
 *H03M 1/00* (2006.01)
 *G02F 7/00* (2006.01)
(52) U.S. Cl.
 CPC .......................................... *G02F 7/00* (2013.01)
 USPC ............................ 341/137; 341/155; 341/132
(58) Field of Classification Search
 CPC ......................................................... G02F 7/00
 USPC .......................................... 341/155, 137, 132
 See application file for complete search history.

(56) References Cited

U.S. PATENT DOCUMENTS

| | | | |
|---|---|---|---|
| 4,384,291 A | 5/1983 | Lewis et al. | |
| 4,732,447 A | 3/1988 | Wright et al. | |
| 5,010,346 A | 4/1991 | Hamilton et al. | |
| 5,955,875 A | 9/1999 | Twichell et al. | |
| 6,118,396 A | 9/2000 | Song | |
| 6,404,366 B1 * | 6/2002 | Clark et al. | 341/137 |
| 6,459,522 B2 | 10/2002 | Yariv | |
| 6,469,649 B1 * | 10/2002 | Helkey et al. | 341/155 |
| 6,525,682 B2 | 2/2003 | Yap et al. | |
| 6,567,436 B1 | 5/2003 | Yao et al. | |
| 6,661,361 B1 | 12/2003 | Lewis et al. | |
| 6,700,517 B1 * | 3/2004 | Kellar | 341/137 |
| 6,714,149 B2 * | 3/2004 | Nunnally | 341/137 |
| 6,771,201 B1 * | 8/2004 | Currie | 341/155 |
| 7,376,349 B2 * | 5/2008 | Ionov et al. | 398/47 |
| 7,564,387 B1 * | 7/2009 | Vawter et al. | 341/137 |
| 7,570,184 B2 * | 8/2009 | Ikeda et al. | 341/137 |
| 7,826,752 B1 | 11/2010 | Zanoni et al. | |
| 7,847,715 B2 * | 12/2010 | Keith | 341/132 |
| 7,868,799 B1 * | 1/2011 | Price et al. | 341/137 |
| 7,876,246 B1 | 1/2011 | Price et al. | |

(Continued)

FOREIGN PATENT DOCUMENTS

WO WO-2011/010314 1/2011

OTHER PUBLICATIONS

U.S. Appl. No. 13/204,158, filed Aug. 5, 2011, Zanoni et al.
U.S. Appl. No. 13/240,226, filed Sep. 22, 2011, Zanoni et al.

(Continued)

*Primary Examiner* — Jean B Jeanglaude
(74) *Attorney, Agent, or Firm* — Donna P. Suchy; Daniel M. Barbieri

(57) ABSTRACT

A photonic analog-to-digital signal conversion system can utilize an optical phase modulator configured to receive a first signal and a first optical pulse signal and to provide an optical phase—modulated pulse signal. A photonic processor can be configured to receive the optical phase—modulated pulse signal and the optical pulse signal and to provide an electronic first demodulated signal and an electronic second demodulated signal. A first comparator can be configured to receive the electronic first demodulated signal and provide a first compared signal, and a second comparator can be configured to receive the electronic second demodulated signal and provide a second compared signal. At least one logic circuit can be configured to receive the first compared signal and the second compared signal.

19 Claims, 8 Drawing Sheets

(56) References Cited

U.S. PATENT DOCUMENTS

| | | | |
|---|---|---|---|
| 7,990,299 B2* | 8/2011 | Bell | 341/137 |
| 8,315,387 B2 | 11/2012 | Kanter et al. | |
| 2007/0159369 A1* | 7/2007 | Currie et al. | 341/144 |
| 2011/0002029 A1* | 1/2011 | McDonald | 359/276 |
| 2012/0087653 A1 | 4/2012 | Sawada et al. | |
| 2012/0212360 A1 | 8/2012 | Kanter et al. | |
| 2012/0213531 A1 | 8/2012 | Nazarathy et al. | |
| 2012/0219302 A1 | 8/2012 | Sun et al. | |
| 2012/0224184 A1 | 9/2012 | Li et al. | |
| 2013/0136450 A1 | 5/2013 | Roberts et al. | |
| 2014/0005966 A1 | 1/2014 | Fireaizen et al. | |

OTHER PUBLICATIONS

U.S. Appl. No. 13/536,939, filed Jun. 28, 2012, Zanoni et al.

Clark et al., Photonics for RF Front Ends, IEEE microwave magazine, May 2011, 9 pages.

Clark et al., Coherent Optical Phase-Modulation Link, IEEE Photonics Technology Letters, Aug. 15, 2007, vol. 19, No. 16, 3 pages.

Valley et al., Photonic analog-to-digital converters: fundamental and practical limits, Integrated Optical Devices, Nanostructures, and Displays, Proceedings of SPIE, 2004, vol. 5618, 11 pages.

Valley, George C., Photonic Analog-to-Digital Converters, A Tutorial, The Aerospace Corporation, 2009, 48 pages.

Valley, George C., Photonic analog-to digital converters, The Aerospace Corporation, Mar. 5, 2007, vol. 15, No. 5, 28 pages.

Zibar et al., Digital Coherent Receiver Employing Photonic Downconversion for Phase Modulated Radio-over-Fibre Links, downloaded on Aug. 2, 2010 from IEEE Xplore, 4 pages.

Zibar et al., Digital Coherent Receiver for Phase-Modulated Radio-Over-Fiber Optical Links, IEEE Photonics Technology Letters, Feb. 1, 2009, vol. 21, No. 3, 3 pages.

Notice of Allowance for U.S. Appl. No. 13/204,158, mail date Jan. 29, 2013, 10 pages.

Notice of Allowance for U.S. Appl. No. 13/240,226, mail date Feb. 14, 2013, 4 pages.

Office Action on U.S. Appl. No. 13/536,929 Dated Mar. 6, 2014, 10 pages.

\* cited by examiner

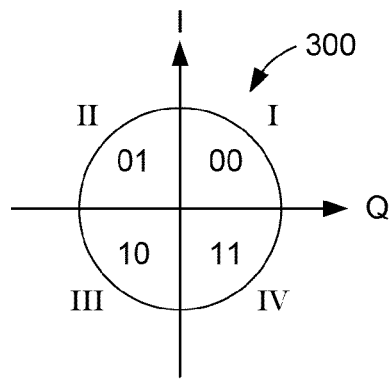
FIG. 3
| RF Amplitude | Quadrant | I | Q | B1 | B0 |
|---|---|---|---|---|---|
| 1 | I | 1 | 1 | 0 | 0 |
| 2 | II | 0 | 1 | 0 | 1 |
| 3 | III | 0 | 0 | 1 | 0 |
| 4 | IV | 1 | 0 | 1 | 1 |
FIG. 4
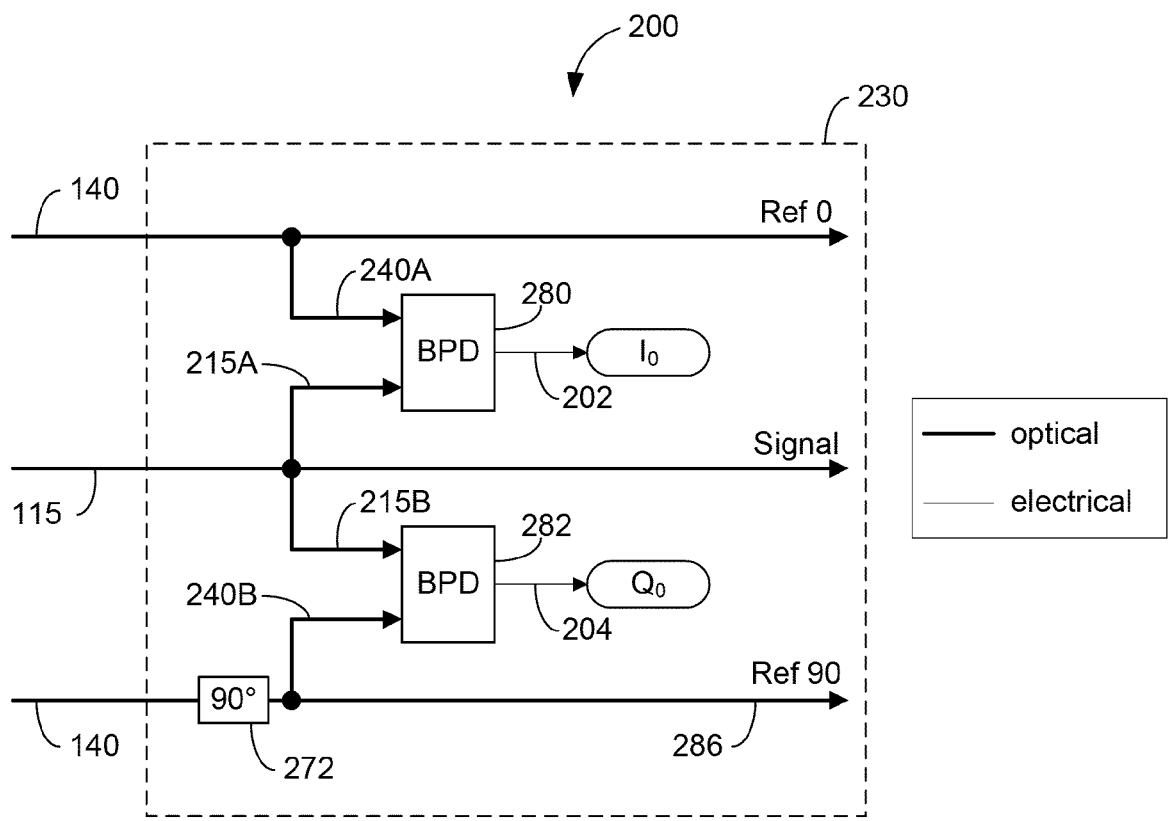
FIG. 5

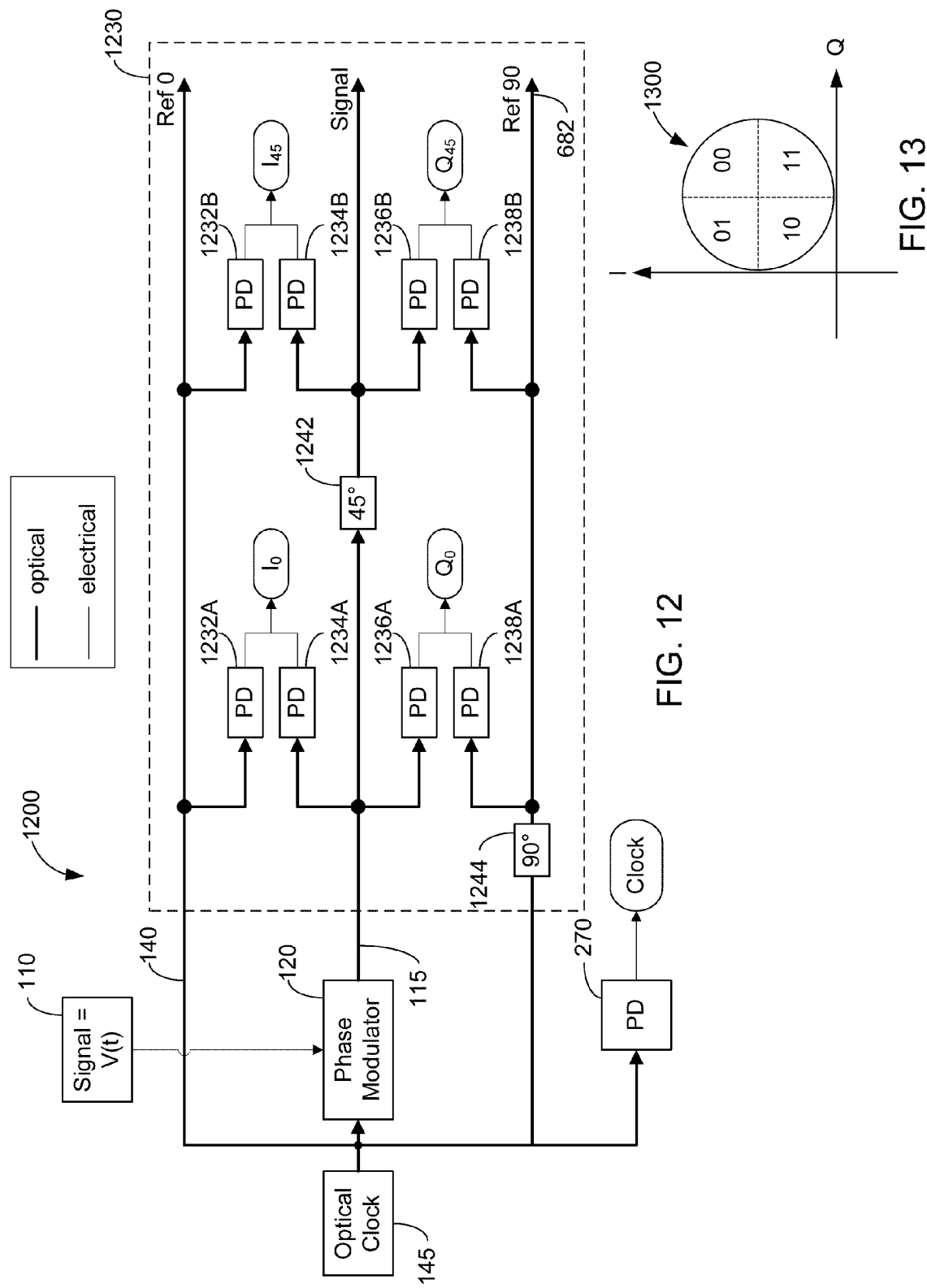

OPTICAL ANALOG-TO-DIGITAL CONVERSION SYSTEM AND METHOD WITH ENHANCED QUANTIZATION

CROSS REFERENCE TO RELATED APPLICATIONS

The present application is related to U.S. patent application Ser. No. 13/536,929, filed Jun. 28, 2012 by Zanoni, U.S. patent application Ser. No. 13/204,158, filed Aug. 5, 2011 by Zanoni; U.S. patent application Ser. No. 13/240,226, filed Sep. 22, 2011, by Zanoni; U.S. patent application Ser. No. 12/387,707 filed May 6, 2009, by Price, et al., now U.S. Pat. No. 7,868,799; and U.S. patent application Ser. No. 12/456,932, filed Jun. 24, 2009 by Price, now U.S. Pat. No. 7,876,246, all assigned to the Assignee of the present application and incorporated herein by reference in their entireties.

FIELD OF THE INVENTION

The present specification generally relates to signal processing. More particularly, the present specification relates to analog-to-digital signal conversion systems and methods.

BACKGROUND OF THE INVENTION

Analog-to-digital conversion techniques are used in a wide variety of applications. Communications and sensing devices frequently use analog-to-digital conversion to convert an analog signal to a digital signal. High speed analog-to-digital conversion is utilized in radio frequency (RF) receivers used in military, commercial and consumer applications. Products that utilize analog-to-digital signal conversion include, but are not limited to: electronic intelligence (ELINT) receivers, cell phones, wireless local area components, radars (e.g., synthetic aperture radar (SAR)), sensors, high frequency (e.g., 100 megahertz (MHz) and multi-Giga Hertz (GHZ)) systems, etc.

Optical or photonic analog-to-digital converters (pADC) can reduce the size, weight, and power requirements of the systems in which they are employed. The pADC generally includes at least one electronic analog-to-digital converter (eADC). The eADC is generally a high resolution ADC which adds to the size, weight and power usage of the pADC.

Accordingly, there is a need for an analog-to-digital conversion system and method configured for reduced size, cost, weight and/or power consumption. Further still, there is a need for an improved photonic analog-to-digital converter (pADC) system and method. Yet further, there is a need for an ADC with optimized quantization. Still further there is a need for a pADC that does not require a high resolution eADC. There is further a need for a pADC system and method that is less susceptible to optical clock amplitude changes. There is further a need for pADCs that uses one or more low resolution eADCs.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One exemplary embodiment relates to an apparatus including a phase modulator, a photonic processor, a first comparator, a second comparator and at least one logic circuit. The phase modulator is configured to receive a first signal and a first optical pulse signal. The phase modulator is configured to provide an optical phase-modulated pulse signal. The photonic processor is configured to receive the optical phase-modulated pulse signal and the optical pulse signal and to provide an electronic first demodulated signal and an electronic second demodulated signal. The first comparator is configured to receive the electronic first demodulated signal and provide a first compared signal, and the second comparator is configured to receive the electronic second demodulated signal and provide a second compared signal. At least one logic circuit is configured to receive the first compared signal and the second compared signal.

Another exemplary embodiment relates to a conversion method. The method includes providing a phase-modulated optical signal and an optical pulse signal, phase delaying the optical pulse signal to provide a first delayed signal, and combining and converting the phase-modulated optical signal and the optical pulse signal to provide an electronic first demodulated signal. The method also includes combining and converting the phase-modulated signal and the first delayed signal to provide an electronic second demodulated signal, comparing the electronic first demodulated signal to a first threshold to provide a first compared signal, comparing the electronic second demodulated signal to a second threshold to provide a second compared signal, and using the first compared signal and the second compared signal to provide a data signal.

Another exemplary embodiment relates to a converter. The converter includes a phase modulator and a photonic processor. The phase modulator is configured to receive a first radio frequency electronic signal and an optical pulse signal. The phase modulator is configured to provide an optical phase-modulated pulse signal. A photonic processor comprises a balanced photo detector or a pair of photo detectors. The pair of photo detectors or the balanced photo detector is configured to receive the optical phase-modulated pulse signal and the optical pulse signal and to provide an electronic demodulated signal.

Another exemplary embodiment relates to a method. A method includes providing a phase-modulated optical signal and an optical pulse signal, and phase delaying the optical pulse signal to provide a first delayed signal. The method also includes combining and converting the phase-modulated signal and the optical pulse signal to provide an electronic first demodulated signal. The method also includes combining and converting the phase-modulated signal and the first delayed signal to provide an electronic demodulated signal. The method also includes a data signal in response to the electronic first and second demodulated signals.

BRIEF DESCRIPTION OF THE DRAWINGS

Embodiments of the invention will become more fully understood from the following detailed description, taken in conjunction with the accompanying drawings, wherein like reference numerals denote the same or similar elements and in which:

FIG. 3 is a representation of quadrants and bit values for demodulated signals provided by the pADC illustrated in FIG. 2 according to an exemplary embodiment;

FIG. 4 is a representation of a truth table for the representation illustrated in FIG. 3;

FIG. 5 is a more detailed schematic block diagram of the photonic processor for the 2-bit pADC illustrated in FIG. 2 in accordance with yet another exemplary embodiment;

FIG. 12 is a general schematic block diagram of a 2-bit pADC in accordance with another exemplary embodiment; and FIG. 13 is a representation of quadrants and bit values for the I and Q values used in the pADC illustrated in FIG. 12.

DETAILED DESCRIPTION OF THE PREFERRED EMBODIMENTS

Figure 1:
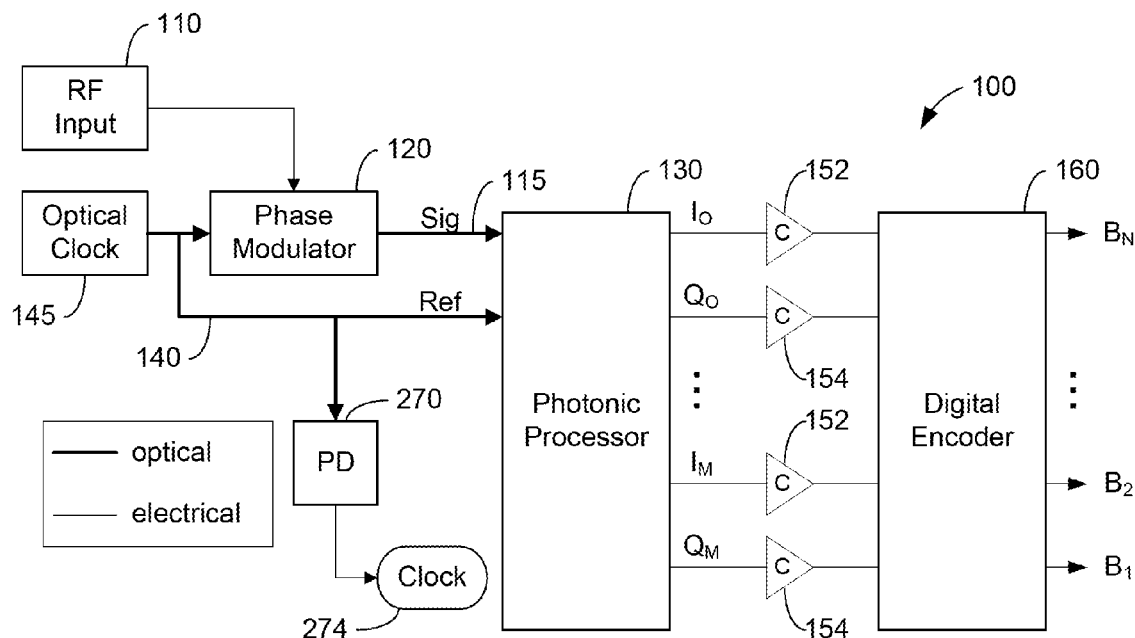
FIG. 1 is a general schematic block diagram of a photonic analog-to-digital converter (pADC) according to an exemplary embodiment.

Before describing in detail the particular improved system and method, it should be observed that the invention includes, but is not limited to, a novel structural combination of components and not in the particular detailed configurations thereof. Accordingly, the structure, software, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

At least one embodiment relates to a photonic (pADC), for example, a pADC provided in a wideband or narrowband RF receiver. However, the pADC systems and methods of the specification can be utilized in any type of conversion applications. The pADC can be used for different types of receiving applications, including but not limited to applications associated with cellular phones, wireless devices, radios (e.g., software defined radio, radio receivers capable of wideband or narrowband receiver operations, etc.), radars (e.g., a digital radar synthetic aperture radar (SAR)), sensors, etc. Advantageously, certain embodiments of systems and methods described herein reduce the need for expensive eADCs and decrease optical power requirements for the pADC by decreasing quantization in the eADC.

One embodiment relates to a method known in the art as Multi-Dimensional Quantization (MDQ), and improves on MDQ methods and apparatuses described, for example, in U.S. Pat. No. 7,868,799. In general, technical benefits of the MDQ method includes the capability to: increase the ENOB of the pADC over that of the constituent electronic ADCs (eADCs); increase the SFDR of the photonic ADC over that of the constituent electronic ADCs; enable the use of optical or hybrid optical/electrical deserialization to reduce the effective sample rate presented to each electronic ADC; allow for simple correction for various imperfections of the optical receiver. However, these benefits and MDQ are not required of certain embodiments claimed herein.

Performing the sampling process using phase modulated optical pulses, as contrasted to simply relaying the RF signal to an electronic ADC for sampling, provides advantages in certain embodiments. Optical sampling allows the sampling to occur using an ultra-low jitter optical pulse source in one embodiment. Various embodiments can achieve one or more of the benefits described above.

FIG. 1 shows a pADC 100 according to one embodiment. In one embodiment, pADC 100 is embodied as an N-bit pADC, where $M=2^{N-2}$, and where M+1 is the number of demodulated values (e.g., the total number of I and Q values divided by 2). N is an integer from 2 to a number where circuit design efficiency is practicable. In one embodiment, N can be 2, 3, 4, 5, 6, 7, 8, . . . 16, . . . 32, . . . 64.

Although specific modulation techniques, parameters, bit values and coordinates for the various conversion systems and methods described herein, they are not disclosed in a limiting fashion. Various adjustments to the types of signals, frequency of operation, types of modulation, etc. can be made without departing from the scope of the invention.

In one embodiment, pADC 100 includes an optical clock 145 for supplying a high repetition rate stream of optical pulses with very low clock jitter (e.g., an optical clock signal). Examples of this type of device include a mode locked laser (MLL) and a coupled opto-electronic oscillator (COED). Any type of suitable optical clock can be utilized.

In one embodiment, pADC 100 receives an RF voltage or signal V(t) at an RF input 110. RF input 110 can be any terminal or circuit for receiving an input signal. In one embodiment, RF input 110 is coupled to a wide band antenna (not shown in FIG. 1), for example. The input signal at RF input 110 is provided to a phase modulator 120, which performs phase modulation in response to the optical pulse signal (e.g., optical clock signal and which outputs a phase-modulated optical pulse stream or signal of an output 115.

The phase-modulated optical pulse stream or signal is provided in accordance with the Nyquist sampling principles. In one embodiment, the optical clock repetition rate is provided at two times the RF input signal frequency. In one embodiment, the RF signal has an amplitude corresponding to a value. The RF signal can represent a phase angle θ, where $\theta = ARCTAN(I_e/Q_e)$ in one embodiment.

In one embodiment, pADC 100 also includes an optical or photonic processor 130 connected to receive signals on a signal path or output 115. Photonic processor 130 is also coupled to a signal path or an output 140 associated with the optical clock signal (e.g., a reference signal) from clock 145. The reference signal is coherent with the phase-modulated signal in one embodiment.

Processor 130 provides demodulated signals as electronic signals (e.g., I and Q values) associated with the RF signal V(t) in electronic format to comparators 152 and 154. Comparators 152 and 154 compare the electronic demodulated signals to an electronic threshold and provide compared signals representing demodulated values or coordinates (e.g., phase, amplitude, quadrature). In one embodiment, processor 130 processes the optical signal at output 115 and the optical pulse signal at output 140 to provide electronic demodulated signals for comparators 152 and 154. In one embodiment, the demodulated signals from photonic processors can be I and Q values associated with phase demodulation, although other types of demodulated values are possible without departing from the scope of the invention. Processor 130 can be configured as an optical demodulator in one embodiment.

In one embodiment, pADC 100 further includes a logic circuit 160 coupled to the outputs of comparators 152 and 154. The compared signals from comparators 152 and 154 are provided to logic circuit 160 and processes to provide a data signal. Comparators 152 and 154 and logic circuit 160 can operate as low resolution eADC. Using comparators 152 and 154 on the outputs of photonic processor 130 requires less power (e.g., microwatts of peak optical power) than a conventional eADC.

Digital logic circuit 160 can be embodied as an encoder, one or more logical gates, a processor, ASIC, etc. Digital encoder 160 provides a data signal including at least one bit. In one embodiment, circuit 160 provides bits $B_1$, $B_2$, $B_3$, $B_N$ as a data signal. The bit signals are provided as an electronic data signal.

Digital logic circuit 160 is a clocked digital encoder in one embodiment and can receive an electronic clock signal converted from the optical pulse signal at output 140 in one embodiment. A photo detector 270 coupled to output 140 can be configured to provide an electronic clock output 274 for processor 130 and logic circuit 160. In addition, comparators 152 and 154 can be clocked. Optical signals at outputs 115 and 140 are combined and compared to provide electronic demodulated signals suitable for logic circuit 160 in one embodiment.

Figure 2:
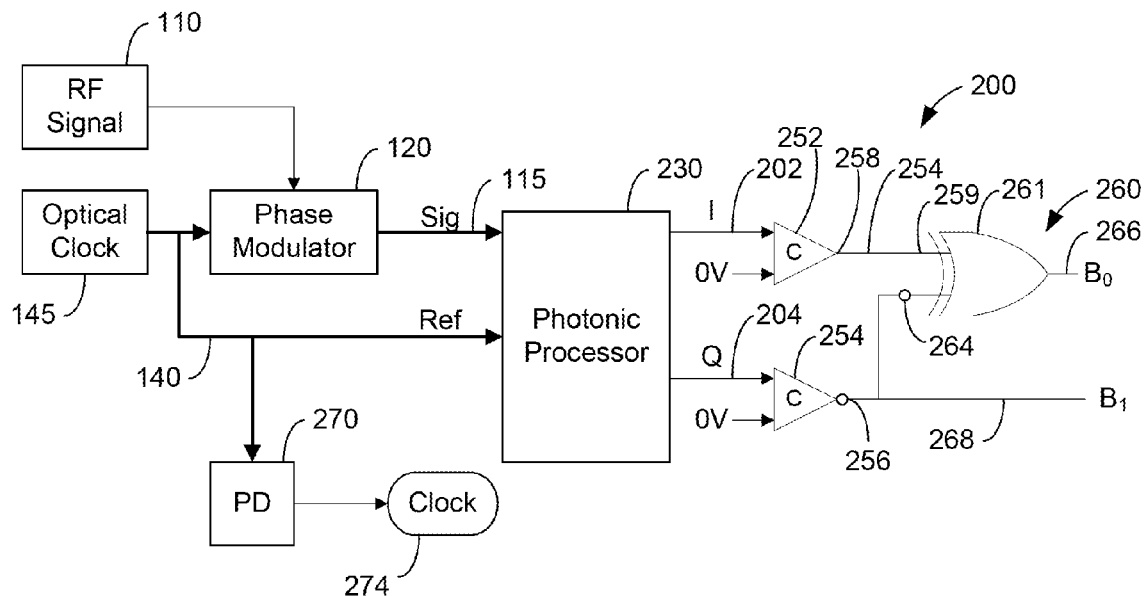
FIG. 2 is a general schematic block diagram of 2-bit photonic analog-to-digital converter (pADC) according to another exemplary embodiment.

With reference to FIG. 2, pADC 200 is embodied as a 2-bit pADC including similar components to the components discussed above with reference to pADC 100. Comparators 152 and 154 compare electronic demodulated signals at outputs 202 and 204 of photonic processor 230 to a threshold (e.g., an approximately 0 volt value). Alternatively, other threshold values can be utilized.

Comparator 254 can include an inverted output 256. A logic circuit 260 can include a logic gate 261. Gate 261 can receive the compared signal from comparator 252 at output 258 at non-inverting input 259 and the inverted compared signal from output 256 at an inverting input 264. Gate 261 can be embodied as an exclusive OR gate including inverted input 264 in one embodiment. An output 266 of exclusive OR gate 261 provides a $B_0$ bit, and an output 268 coupled to inverted output 256 of comparator 254 provides a $B_1$ bit signal. Bit signals $B_0$ and $B_1$ comprise an electronic data signal for pADC 200.

Gate 261 is clocked in one embodiment. An electronic clock signal at node or output 274 is derived from the signal at output 140 can be provided by photo detector 270. The electronic clock signal at output 274 can be used to clock electronic circuits in pADC 200 including gate 261. Although a specific logic configuration is shown for gate 261, other logic devices can be utilized including inverters, AND gates, OR gates, NOR gates, AND gates, encoders, logic processors, etc.

With reference to FIG. 3, exemplary demodulated signals for pADC 200 are embodied as I and Q signals having quadrants I, II, III and IV representing bits $B_1$ $B_0$ (00, 01, 10, 11) respectively, as shown in diagram 300. FIG. 4 shows an exemplary truth table 400 for demodulated signals I and Q, RF amplitude 1-4, quadrants I-IV and bits $B_1$ and $B_0$. Diagram 300 and Table 400 are exemplary, various modifications can be made without departing from the scope of the invention.

With reference to FIG. 5, photonic processor 230 of pADC 200 includes an optical phase delay 272 coupled to output 140. Phase delay 272 is a 90 degree phase delay in one embodiment. Phase delay 272 can be embodied as an optical path length whether free space, thin film, optical fiber, planer waveguide, etc., and provides the optical clock or pulse signal from output 140 after a 90 degree phase delay.

Photonic processor 230 includes a photo detector 280 and a photo detector 282. Photo detectors 280 and 282 each include respective inputs 215A and 215B coupled to output 115. Detector 280 includes an input 240A coupled to output 140, and detector 282 includes an input 240B coupled to an output 286 of phase delay 272. Photo detectors 280 and 282 provide electronic demodulated signals at respective outputs 202 and 204 and can be balanced photo detectors.

The electronic demodulated signals can be an $I_0$ signal and $Q_0$ signal. In one embodiment, detectors 280 and 282 provide respective electronic signals representative of the difference between optical signals at respective inputs 215A-B and 240A-B which represent an electronic $I_0$ signal and an electronic $Q_0$ signal. In one embodiment, processor 230 and comparators 252 and 254 cooperate to combine and compare signals from outputs 115 and 140 to provide electronic demodulated signals. In one embodiment, the electronic demodulated signals are converted to bits $B_0$ and $B_1$ according to Table 400.

Figures 6, 7:
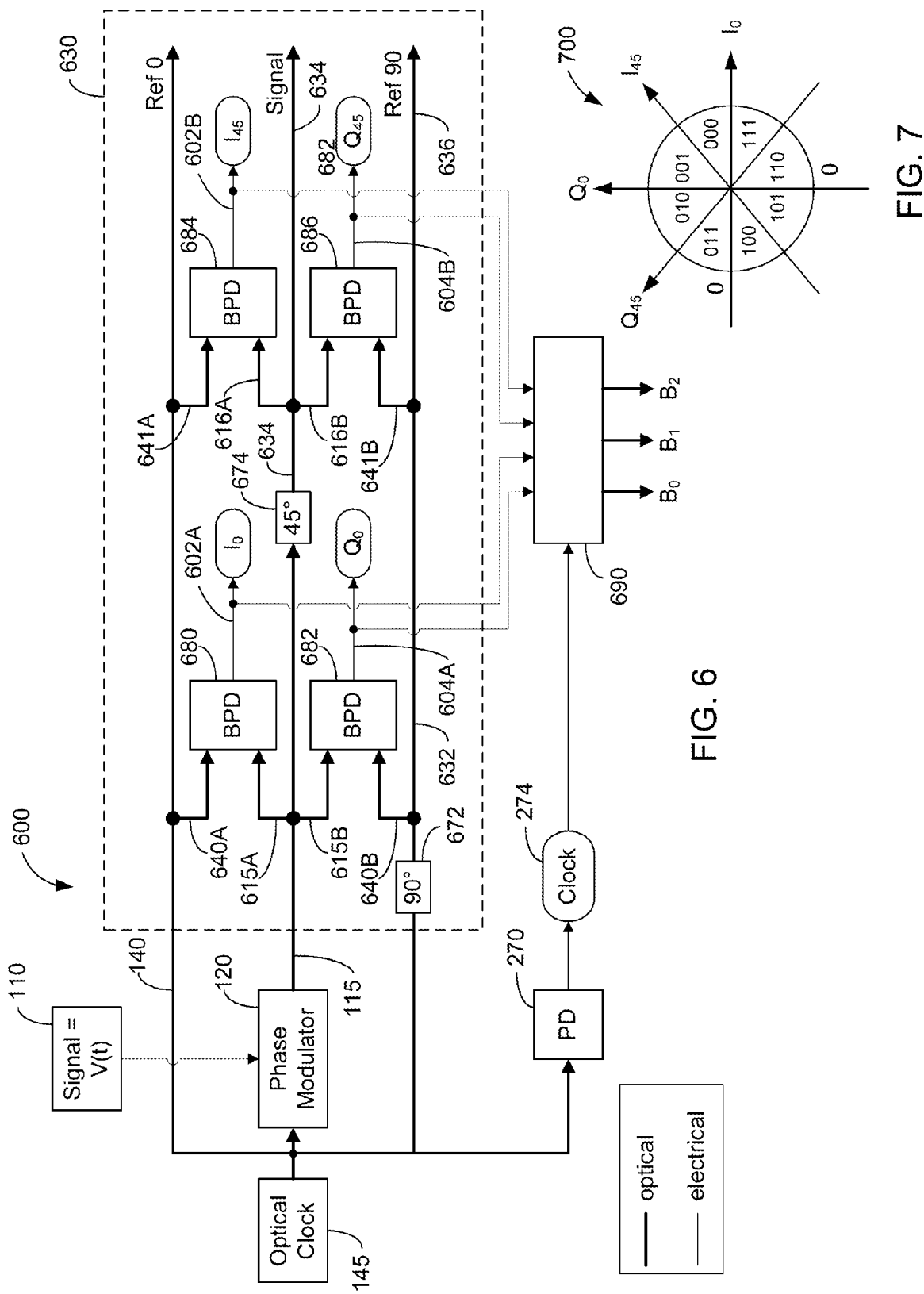
FIG. 6 is a general schematic block diagram of a 3-bit pADC according to a yet another exemplary embodiment.
FIG. 7 is a representation of quadrants and bit values for demodulated signals provided by the pADC illustrated in FIG. 6 according to an exemplary embodiment.

With reference to FIG. 6, a pADC 600 is similar pADC 200 discussed with reference to FIGS. 2-5. In one embodiment, pADC 600 is a 3 bit converter and includes a photonic processor 630 including balanced photo detectors 680, 682, 684 and 686. Processor 630 includes a 90 degree phase delay 672 and a 45 degree phase delay 674 in one embodiment. Phase delay 674 is coupled to output 115 of phase modulator 120.

Balanced photo detector 680 includes an input 640A coupled to output 140 and an input 615A coupled to output 115. Detector 682 includes an input 615B coupled to output 115 and an input 640B coupled to an output 632 of phase delay 672. Detector 684 includes an input 616A coupled to an output 634 of phase delay 674 and an input 641A coupled to output 140. Detector 686 includes an input 616B coupled to output 634 and an input 641B coupled to output 632.

In one embodiment, detector 680 provides a first demodulated signal (e.g., an $I_0$ signal) at output 602A, and detector 682 provides a second demodulated signal at an output 602B (e.g., an $I_{45}$ signal). In one embodiment detector 682 provides a third demodulated signal (e.g., $Q_0$) at an output 604A and detector 686 provides a fourth demodulated signal (e.g., $Q_{45}$) at an output 604B. Logic circuit 690 receives signals at outputs 602A-B and 604A-B (or compared versions thereof). In one embodiment logic circuit 690 includes comparators. In another embodiment, separate converters are disposed between circuit 690 and outputs 602A-B and 604A-B.

With reference to FIG. 7, quadrants and bit values for pADC 600 are represented in a diagram 700. Outputs respective of 602A-B, 604A-B detectors 680, 682, 684 and 686 are compared to a threshold and coupled to a logic circuit 690 for providing bit values $B_0$, $B_1$ and $B_3$ according to diagram 700 in one embodiment.

Figure 8:
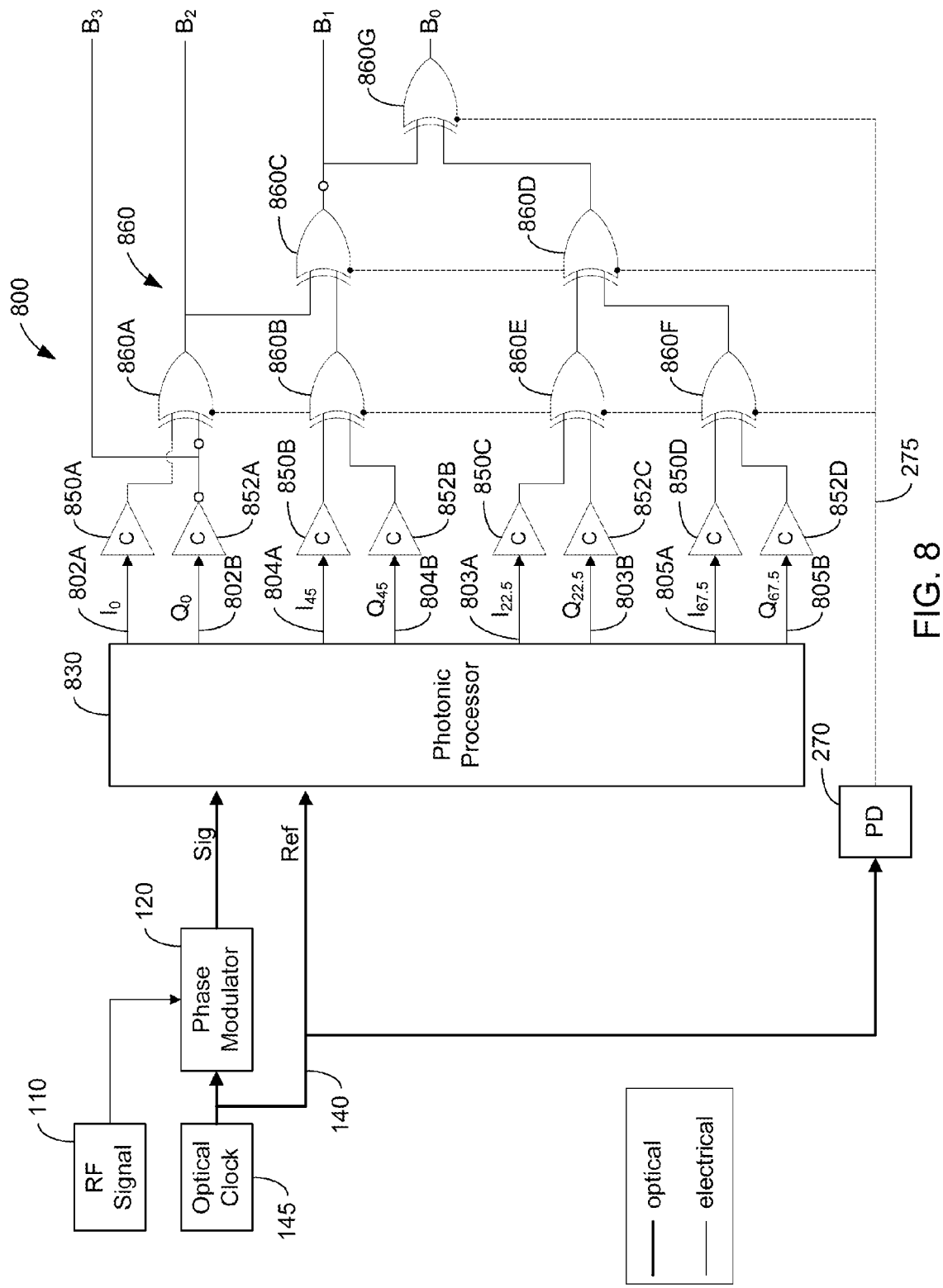
FIG. 8 is a general block schematic diagram of a 4-bit pADC according to yet another exemplary embodiment.

With reference to FIG. 8, a pADC 800 is embodied as a 4-bit optical flash ADC and includes a clock path 275 for a logic circuit 860. In one embodiment, pADC 800 includes similar components to pADC 600 and includes a photonic or optical processor 830, comparators 850A-D and comparators 852A-D. Logic circuit 860 includes clock gates 860A-G. Path 275 can be coupled to detector 270.

Figure 9:
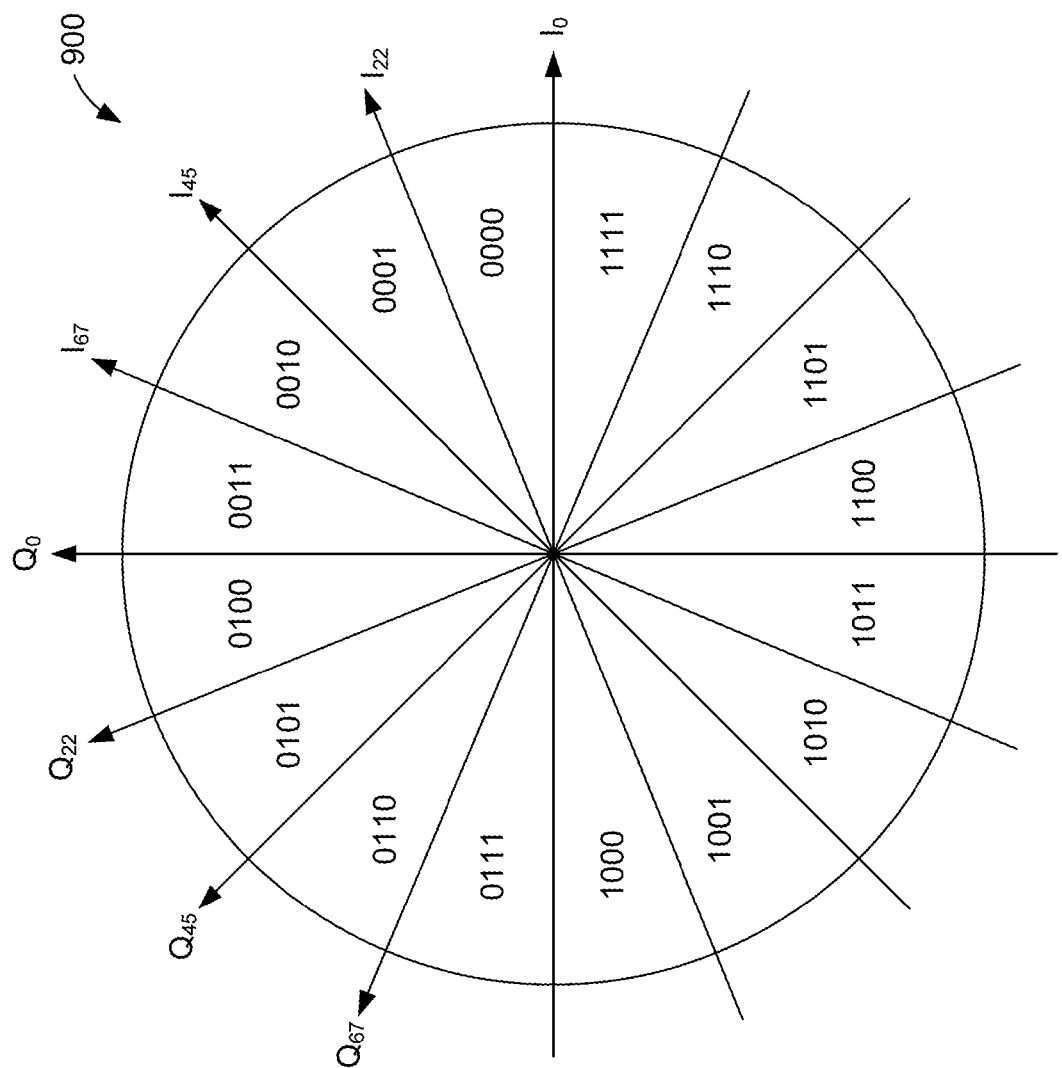
FIG. 9 is a representation of quadrants and bit values for demodulated signals associated with the pADC illustrated in FIG. 8 according to an exemplary embodiment.

With reference to FIG. 9, diagram 900 shows I and Q parameters or values and associated quadrants and bit values for pADC 800 according to one embodiment. Logic circuit 860 provides bit values $B_0$, $B_1$, $B_2$, $B_3$ in accordance with diagram 900 according to one embodiment. Diagram 900 shows 16 quadrants.

Figure 10:
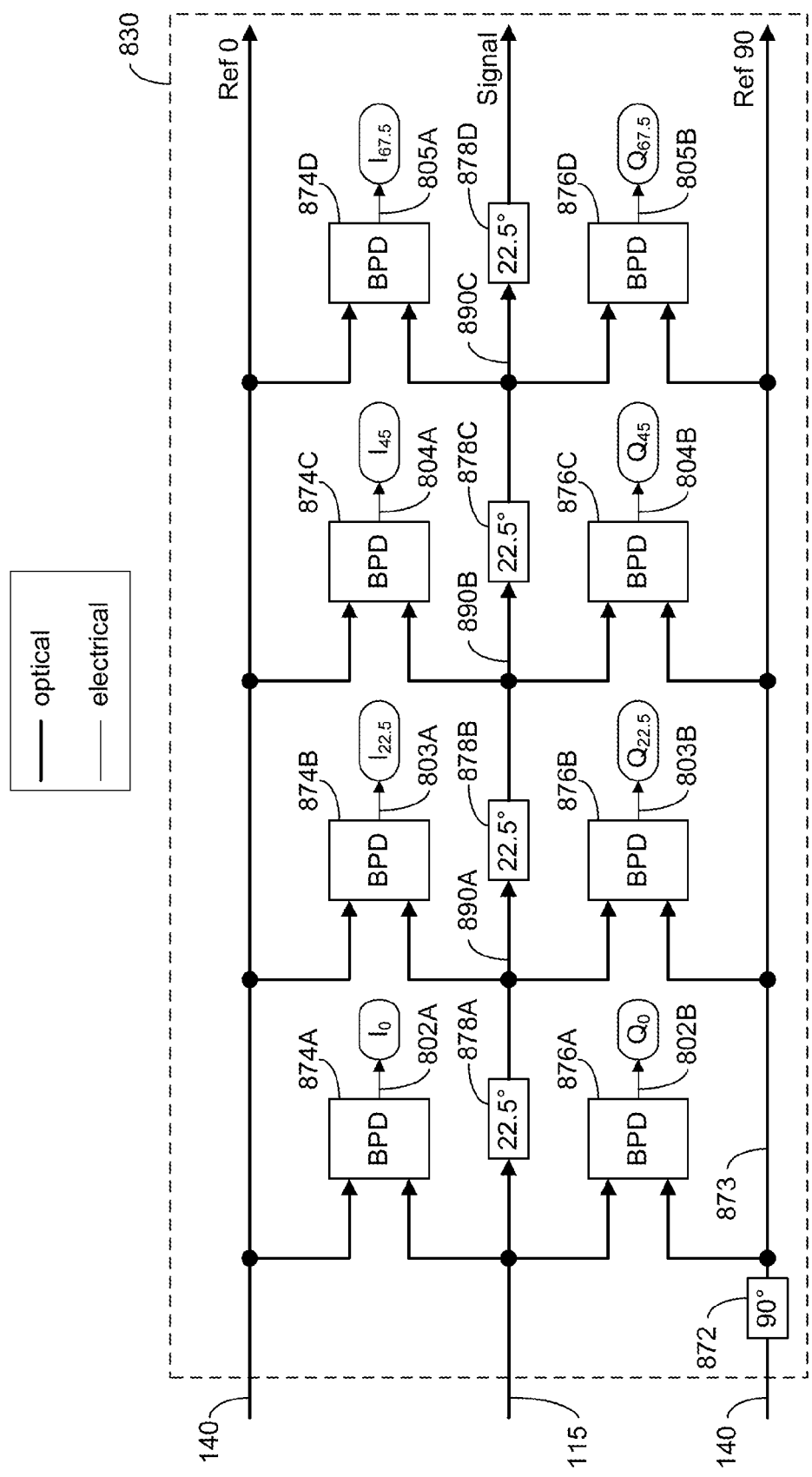
FIG. 10 is a more detailed general schematic block diagram of the photonic processor for the pADC illustrated in FIG. 8 in accordance with yet another exemplary embodiment.

With reference to FIG. 10, optical processor 830 of pADC 800 includes phase delays 878A-D and balanced photo detectors 874A-D and 876A-D. Each balanced photo detector 874A-D includes an input coupled to output 140. Balanced photo detectors 876A-D each include an input coupled to an output 873 of phase delay 872. Phase delays 878A-C are 22.5 degree optical phase delays in one embodiment, and phase delay circuit 270 is a 90 degree optical phase delay in one embodiment. Detectors 874A and 876A each include an input coupled to output 115. Detectors 874B and 876B each include an input coupled to an output 890A of phase delay 974A. Detectors 874C and 876C each include an input coupled to an output 890B of phase delay 878B. Detectors 874D and 876D each include an input coupled to an output 890C of phase delay.

Detectors 874A and 876A provide respective demodulated signals (e.g., $I_0$ and $Q_0$) at respective outputs 802A and 802B. Detectors 874B and 876B provide respective demodulated signals (e.g., $I_{22.5}$ and $Q_{22.5}$) at respective outputs 803A and 803B. Detectors 874C and 876C provide respective demodulated signals (e.g. $I_{45}$ and $Q_{45}$) at respective outputs 804A and 804B. Detectors 874D and 876D provide respective demodulated signals (e.g. $I_{67.5}$ and $Q_{67.5}$) at respective outputs 805A and 805B.

With reference to FIG. 8, bits values $B_0$, $B_1$, $B_2$ and $B_3$ can be provided as an exclusive OR function of the outputs of comparators 850A-D and the outputs of comparators 852A-D. Bit $B_1$ at the inverted output of gate 860C is provided as an exclusive OR function of the output of gate 860A (e.g., bit $B_2$) and the output of exclusive OR gate 860B which has inputs coupled to comparators 850B and 852B in one embodiment. Bit $B_0$ is provided by exclusive OR gate 860G having an input coupled to an inverted output of exclusive OR gate 860C (e.g., bit $B_1$) and the output of exclusive OR gate 860D. Exclusive OR gate 860D provides an exclusive OR function for the output of exclusive OR gates 860E and 860F. Exclusive OR Gate 860E includes inputs coupled to the output of comparators 850C and 852C, and exclusive OR gate 860F has inputs coupled to comparators 850D and 852D in one embodiment. Bit B2 is provided as an exclusive OR function using exclusive or gate 860A of the outputs of comparators 850A and 852A. Gate 860A includes an inverted input coupled to comparator 852A. Bit B3 is provided as the inverted output of comparator 852A.

Figure 11:
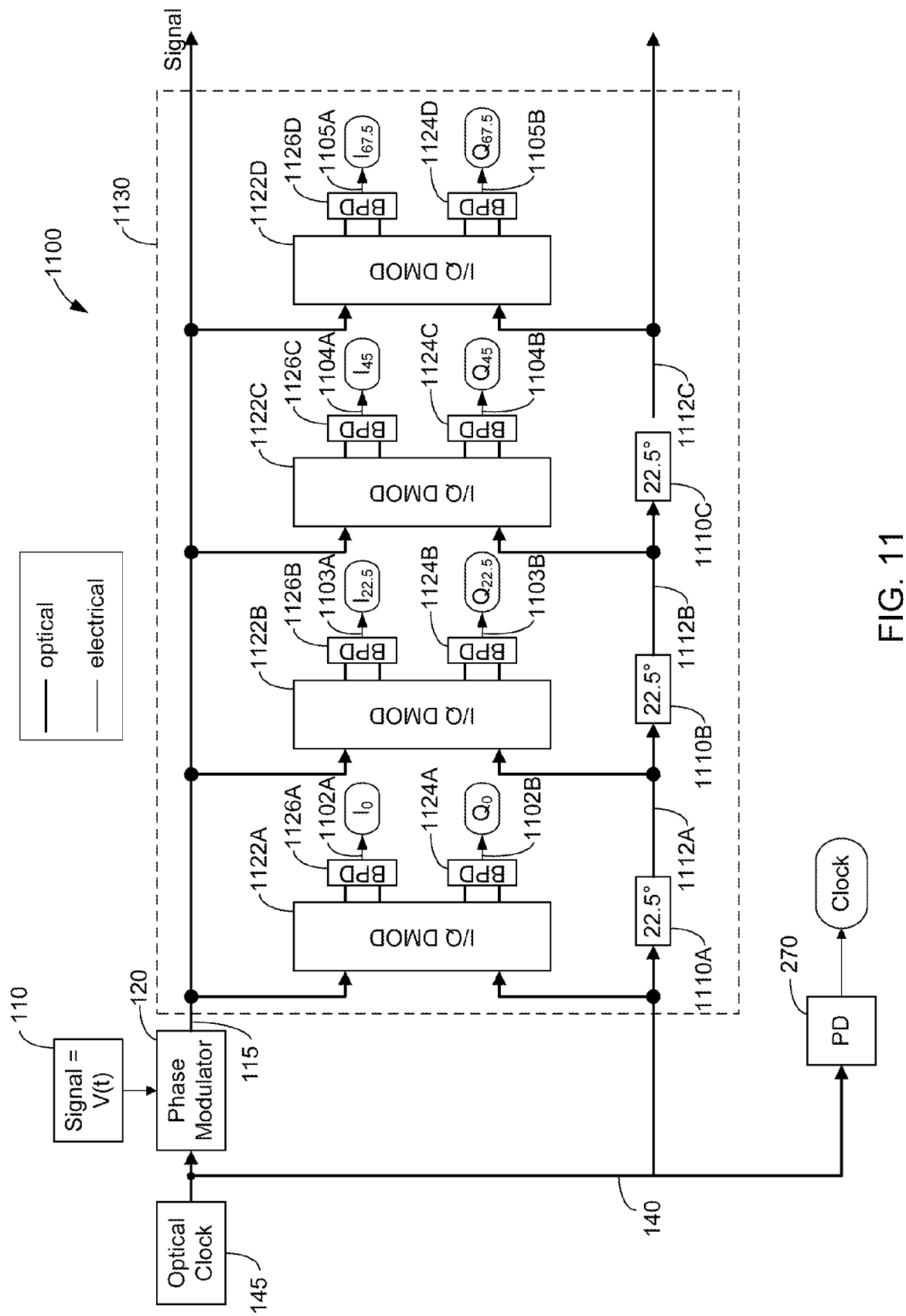
FIG. 11 is a general schematic block diagram of a 4-bit pADC in accordance with yet still another exemplary embodiment.

With reference to FIG. 11, a pADC 1100 similar to pADC 800 includes a set of optical I/Q demodulators 1122A-D. In one embodiment, pADC 1100 is embodied as a O-bit optical flash implementation of a converter. Each of I/Q demodulators 112A-D includes outputs coupled to respective balanced photonic detectors 1126A-D and 112A-D. I/Q demodulators 1122A-D each include an input coupled to output 115, and demodulator 1122A includes an input coupled to output 140.

In one embodiment, pADC 1100 also includes a set of optical 22.5 degree phase delays 1110A-C. In one embodiment, I/Q demodulator 1122B includes an input coupled to an output 1112A of delay 1110A. I/Q demodulator 1122C includes an input coupled to an output 1112B of delay 110B. I/Q demodulator 1102D includes an input coupled to an output 1112C of delay 1110C.

Demodulator 1122A provides a first demodulated signal (e.g., $I_0$) in differential form to balanced photo detector 1126A. Demodulator 1122A also provides a second demodulated signal (e.g., $Q_0$) in differential form to balanced photo detector 1124A in one embodiment. Demodulator 1122B provides a third demodulated signal (e.g., $I_{22.5}$) in differential form to detector 1126B, and demodulator 1122B provides a fourth demodulated signal (e.g., $Q_{22.5}$) in differential form to balanced photo detector 1124B in one embodiment. Demodulator 1122C provides a fifth demodulated signal (e.g., $I_{45}$) in differential form balanced photo detector 1124C and provides a sixth modulated signal (e.g., $Q_{45}$) to balanced photo detector 1124C in one embodiment. Demodulator 1122D provides a seventh demodulated signal in differential form (e.g., $I_{67.5}$) to balance photo detector 1126D and provides an eight demodulated signal in differential form (e.g., $Q_{67.5}$) to balanced photo detector 1124D. The electronic signals at outputs 1102A-B, 1103A-B, 1104A-B, and 1105A-B of detectors 116A-D and 114A-D can be compared to a threshold and provided to a logic circuit for providing bit signals consistent with diagram 900 in one embodiment.

With reference to FIG. 12, a pADC 1200 is embodied as a 2-bit converter similar to pADC 200 and includes a photonic processor 1230. In one embodiment, pADC 1200 includes comparators and a logic circuit that provides bit signals $B_0$ and $B_1$ according to diagram 1300 (FIG. 13). Photonic processor 1230 includes photo detectors 1232A-B, photo detectors 1234A-B, photo detectors 1236A-B and photo detectors 1238A-B. Detectors 1232A-B, 1234A-B, 1236A-B and 1238A-B can be embodied as non-balanced photo detectors. The use of non-balanced photo detectors results in a shift of the constellation as shown in diagram 1300 in FIG. 13.

Photo detectors 1232A and B have an input coupled to output 140, and photo detectors 1234A and 1236A have an input coupled to output 115 in one embodiment. Photo detectors 1234B and 1236B have an input coupled to an output of phase delay 1242 in one embodiment. Delay 1242 provides an optical phase delay of 45 degrees in one embodiment.

Photo detectors 1238A-B have an input coupled to an output of phase delay 1244. Delay 1244 provides a 90 degree phase delay in one embodiment. Detectors 1232A and 1234A provide a first demodulated signal (e.g., $I_0$). Detectors 1232B and 1234B provide a second demodulated signal (e.g., $I_{45}$). Detectors 1236A and 1238A provide a third demodulated signal (e.g., $Q_0$). Detectors 1236B and 1238B provide a fourth demodulated signal (e.g., $Q_{45}$). The outputs of detectors 1232A-B, 1234A-B, 1236A-B and 1238A-B can be coupled to a logic circuit for providing a data signal in accordance with diagram 1300. Comparators can be provided between the logic circuit and detectors 1232A-B, 1234A-B, 1236A-B and 1238A-B.

Advantageously, pADCs 100, 200, 600, 800, 1100 and 1200 reduce computational efforts related to computing phase angle from I and Q values in one embodiment. In addition, embodiments of pADCs 100, 200, 600, 800, 1100 and 1200 can eliminate the use of higher resolution electronic ADCs required to quantize the I and Q signals. Using comparators such as comparators 152 and 154 on the outputs of photonic processor 130 reduces the peak optical requirements substantially.

According to various embodiments, pADCs 100, 200, 600, 800, 1100 and 1200 can be utilized in a variety of applications including high capacity optical communications receivers, telecommunication receivers, Department of Defense (DOD) wide receiver technology, digital radar, sensors, etc. In one embodiment, pADCs 100, 200, 600, 800, 1100 and 1220 can be implemented using optical and electric circuit components as described herein including processors, FPGAs, ASICS, opto electronic circuits, etc.

Phase modulator 120 can be a phase modulator such as described in U.S. patent application Ser. No. 13/240,226. Clock 145 can be an optical clock as 800 described in U.S.

patent application Ser. No. 13/240,226. Demodulators 1122A-D can be an optical or photonic demodulator as described in U.S. patent application Ser. No. 13/240,226 in one embodiment. Alternative optical demodulators can be utilized depending upon design criteria and modulation types.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of signals, optical component, dimensions, modulation, frequencies and angles are mentioned, other components, dimensions and angles can be utilized. Also, while an optical deserialization with gated detectors system and method have been described above with respect to inclusion in a wideband or a narrowband receiver, it can be implemented in other types of high-frequency band receivers, such as receivers operating up to hundreds of GHz. Various changes may be made to the details disclosed without departing from the spirit of the invention which is defined by the following claims.

What is claimed is:

1. An apparatus, comprising:
   a phase modulator configured to receive a first signal and a first optical pulse signal and to provide an optical phase-modulated pulse signal;
   a photonic processor configured to receive the optical phase-modulated pulse signal and the first optical pulse signal and to provides an electronic first demodulated signal and an electronic second demodulated signal;
   a first comparator being configured to receive the electronic first demodulated signal and provide a first compared signal;
   a second comparator configured to receive the electronic second demodulated signal and provide a second compared signal; and
   at least one logic circuit configured to receive the first compared signal and the second compared signal, the logic circuit encoding phase sectors associated with the first and second demodulated signals into a binary code.

2. The apparatus according to claim 1, wherein the at least one logic circuit is an exclusive or gate including a first input receiving the first compared signal and a second input receiving the second compared signal.

3. The apparatus according to claim 1, wherein at least one logic gate comprises a first input configured to receive the first compared signal and a second input configured to receive the second compared signal and an output providing a first bit of the binary code, wherein the second compared signal is inverted at the second input and the second compared signal is provided as a second bit of the binary code.

4. The apparatus of claim 1, wherein the first and second comparators respectively compare the electronic first demodulated signal and the electronic second demodulated signal to a threshold of approximately zero volts.

5. The apparatus of claim 1, wherein the electronic first demodulated signal and the electronic second demodulated signal represent I and Q values respectively.

6. The apparatus of claim 1, wherein the optical processor comprises a first photodetector receiving the first optical pulse signal and the optical phase-modulated pulse signal and a second photodetector receiving the optical phase-modulated pulse signal and a first phase delayed signal of the first optical pulse signal, the first photodetector providing the electronic first demodulated signal and the second photodetector providing the electronic second demodulated signal.

7. The apparatus of claim 6, wherein the first and second photodetectors are balanced photodetectors.

8. The apparatus of claim 6, wherein the optical processor comprises a third photodetector receiving the first phase delayed signal of the first optical pulse signal and a second phase delayed signal of the optical phase-modulated pulse signal and a fourth photodetector receiving the second phase delayed signal of the optical phase modulated pulse signal and the first optical pulse signal, the third photodetector providing an electronic third demodulated signal and the fourth photodetector providing an electronic fourth demodulated signal, wherein the at least one logic gate is a logic circuit receiving the first, second, third and fourth demodulated signals.

9. The apparatus of claim 8, wherein the optical processor comprises a fifth photodetector receiving the first phase delayed signal of the first optical pulse signal and a third phase delayed signal of the optical phase-modulated pulse signal and a sixth photodetector receiving the third phase delayed signal of the optical phase modulated pulse signal and the first optical pulse signal, the fifth photodetector providing an electronic fifth demodulated signal and the sixth photodetector providing an electronic sixth demodulated signal, wherein the logic circuit receiving the fifth and sixth demodulated signals.

10. The apparatus of claim 9, wherein the optical processor comprises a seventh photodetector receiving the first phase delayed signal of the first optical pulse signal and a fourth phase delayed signal of the optical phase-modulated pulse signal and an eighth photodetector receiving the fourth phase delayed signal of the optical phase modulated pulse signal and the first optical pulse signal, the seventh photodetector providing an electronic seventh demodulated signal and the eighth photodetector providing an electronic eighth demodulated signal, wherein the logic circuit receiving the seventh and eighth demodulated signals.

11. The apparatus of claim 1, wherein the optical processor comprises a first demodulator receiving the first optical pulse signal and the optical phase-modulated pulse signal, a second demodulator receiving the optical phase modulated pulse signal and a first phase delayed signal of the first optical pulse signal, the first demodulator providing the electronic first demodulated signal and the second demodulator providing the electronic second demodulated signal, wherein the optical processor comprises a third demodulator receiving a second phase delayed signal of the first phase delayed signal of and the optical phase-modulated pulse signal and a fourth photodetector receiving a third phase delayed signal of the second phase delayed signal and the optical phase-modulated signal, the third photodetector providing a third electronic demodulated signal and the fourth photodetector providing a fourth electronic demodulated signal, wherein the at least one logic gate is a logic circuit receiving the first, second, third and fourth demodulated signals.

12. A method comprising:
   providing a phase-modulated optical signal and an optical pulse signal;
   phase delaying the optical pulse signal to provide a first delayed signal;
   combining and converting the phase-modulated optical signal and the optical pulse signal to provide an electronic first demodulated signal;
   combining and converting the phase-modulated optical signal and the first delayed signal to provide an electronic second demodulated signal; and providing a data signal in response to the electronic first and second demodulated signals.

13. The method according to claim 12, wherein the combining and converting uses balanced photo detectors, and the first and second demodulated signals are compared to a threshold.

14. The method according to claim 12, further comprising:
phase delaying the phase-modulated optical signal to provide a second delay signal; and
combining and converting the first delayed signal and the second delayed signal to provide an electronic third demodulated signal.

15. The method according to claim 14, further comprising; combining and converting the second delayed signal and the optical pulse signal to provide an electronic fourth demodulated signal.

16. The method according to claim 15, wherein the third and fourth demodulated signals are used to provide the data signal.

17. The method according to claim 12, wherein the data signal is provided using an XOR function.

18. The method according to claim 12, wherein the method is performed in an electronic intelligence receiver.

19. The method of claim 12, wherein the electronic first and second demodulated signals comprise I and Q values.

* * * * *